(No Model.)
T. J. PERRETT.
DEVICE FOR CHANGING SPEED.
No. 272,763. Patented Feb. 20, 1883.
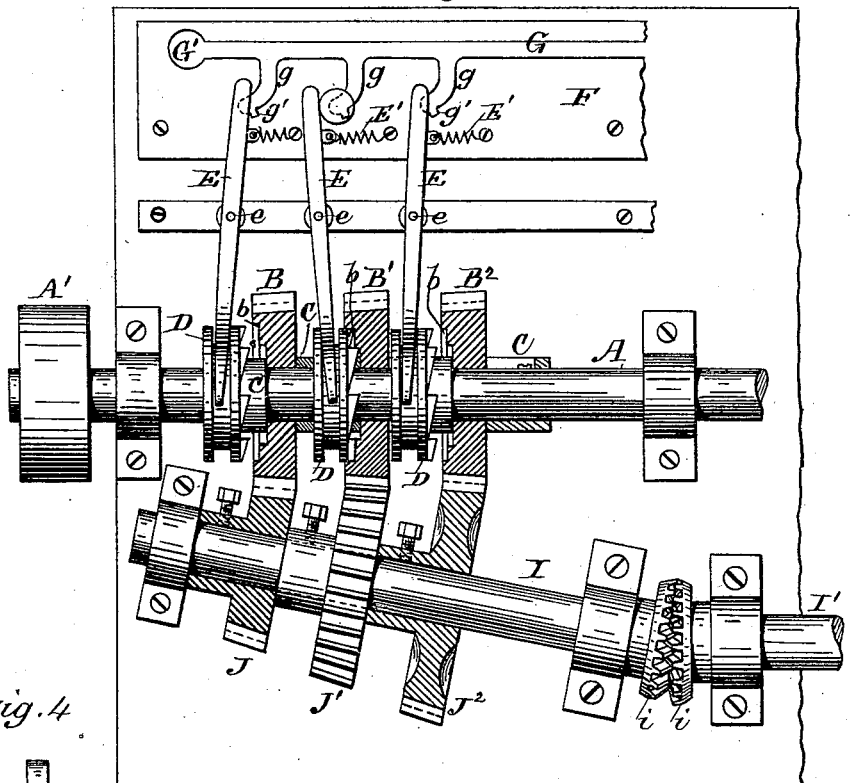
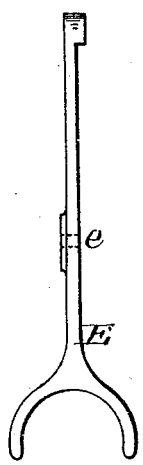
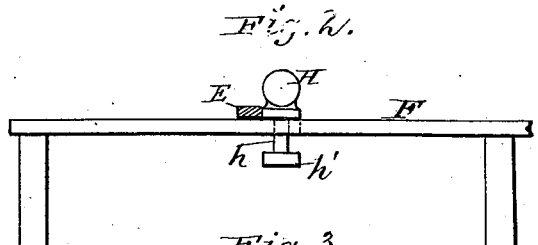
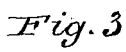
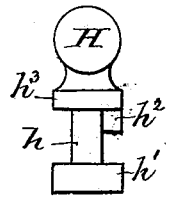
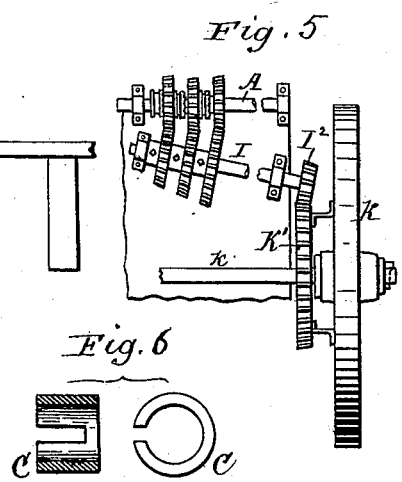
Witnesses:
W. S. Masson
L. C. Hills
Inventor:
Thomas J. Perrett
by E. E. Masson
atty.

UNITED STATES PATENT OFFICE.

THOMAS J. PERRETT, OF JAMESTOWN, NEW YORK.

DEVICE FOR CHANGING SPEED.

SPECIFICATION forming part of Letters Patent No. 272,763, dated February 20, 1883.

Application filed January 2, 1883. (No model.)

*To all whom it may concern:*

Be it known that I, THOMAS J. PERRETT, a citizen of England, residing at Jamestown, in the county of Chautauqua and State of New York, have invented certain new and useful Improvements in Change-Speed Mechanism, of which the following is a specification.

The object of my invention is to provide means for changing at will the speed of a driven shaft without varying the speed of the driving-shaft in any mechanism where power is conveyed direct and applied by means of rotating shafts connected together by gearing or equivalent devices, and to provide such means for the purpose stated as can be readily utilized in all cases requiring such functions, as in grain-drills, hoisting apparatus, and in the feed mechanism of other structures—in fact, wherever variable or changeable speed is required or advantageous.

Referring to the drawings, Figure 1 is a plan of a changeable-speed mechanism constructed in accordance with my invention. Fig. 2 is a side view of the hand-levers, retaining-plate, and locking-pin; Fig. 3, an elevation of a lever locking pin. Fig. 4 is a side view of one of the clutch-levers. Fig. 5 is a modification in the mode of transmitting power to the clutch-gears. Fig. 6 is a section and end view of one of the gear-separating collars.

Like letters refer to like parts in all the figures.

A represents the main or driving shaft. This may be operated by a crank or by a belt-pulley, A', fixed thereon and connected to any convenient motor, or, as in the case of a grain-drill, said shaft may be the axle rotated by the friction of the traction or ground wheels of the drill. Any suitable means or portion of known machinery to which my novel changeable gear is applied may cause the rotation of the shaft A in the desired direction. Upon the shaft A is a series of gear-wheels, B B' B², of equal diameter and pitch—say twenty teeth of seven-sixteenths pitch. These gears are provided with clutch-teeth $b$, and are so fitted as to revolve upon and independently of the shaft A. They are recessed on one side to receive the end of a thimble, C, which is fixed to and rotates with the shaft. These thimbles serve to retain the gears B B' B² from longitudinal movement upon the shaft, and may be secured to the shaft by countersunk set-screws, or by a spline or key set in the shaft and slightly projecting into the slots $c$ of the thimbles; or the thimbles and shaft may be drilled and a pin driven in. Upon each of the thimbles is mounted the clutch-collar D, which is caused to rotate with the shaft and thimbles by means of a spline projecting radially within the interior of the clutch D, and entering in the thimble, as before stated. One spline may act to secure the rotation of the element D, and the thimbles with the shaft; but as this would evidently increase the friction of the parts against longitudinal movement of the clutch, I prefer securing the thimbles by countersunk set-screws, as above stated. The movable clutch D is circumferentially grooved to receive a bifurcated lever, E, (see Fig. 4,) which is pivoted at $e$ to a convenient fixed portion of the frame-work. The lever extends over a dial-plate, F, which is provided with a main slot, G, and communicating branch slots $g$, terminating in semicircular or rounded ends, and an offset, $g'$. Spiral or other suitable springs, E', tend to draw the free ends of the levers over or beyond the termination of the branch slots, and thus retain the clutch D from contact with its opposite member on the adjacent gear B. The main slot G is also provided with a circular opening, G', made large enough for the insertion of the locking-pin.

H represents a locking-pin having a cylindrical body, $h$, adapted to be passed within the main and branch slots of the dial-plate, heads $h'$ and $h^3$, adapted to prevent the removal of the pin from the slots in a vertical direction, and a feather, $h^2$, whereby the pin may be dropped into and retained by the offset $g'$ in the circular terminations of the branch slots.

I represents the driven shaft, arranged diagonally to the driving-shaft A, in order to permit the series of gears J J' J², of varying diameters, which are fixed thereon, to mesh with the gears B B' B² on the driving-shaft. The driven shaft is connected by bevel-gears $i$ $i$ to a shaft, I', arranged parallel to the shaft A, this being done only when it is desirable to maintain parallelism in these shafts. In cases where this is not required the bevel-gears *i i* may be dispensed with and the shaft I may constitute a working-shaft. A ball-joint may also be used in place of the gears *i i*. It will be noticed that the gears J J' J² vary in diameter, and I prefer such variation to be regular when a system of specific differences of result in speed is desired. For instance, the number of teeth may vary by four, increasing in each successive gear, while the pitch and bevel of each wheel would be the same as in the gears B B' B². It is not absolutely necessary that the gears and pinion be close together. They may be separated by additional collars and the pitch of the shaft I altered to suit the case. In this instance only three gears are shown; but a larger number may be used.

It is apparent that the pin H may be shifted through the branch and main slots, so as to be brought into either of the former and be locked in position to throw and retain the free end of an adjacent lever to the left, as shown, whereby the clutch connected therewith is thrown into mesh with its adjacent gear; and in this manner either of the combinations B J, B' J', or B² J² may readily be made and the relative rotations of the shafts A I correspondingly increased or diminished at will. By raising the pin until its base $h'$ strikes against the under side of the dial-plate, the feather $h^2$ may ride the upper surface and the pin be moved along the slots, and whenever it occupies other than the ends of the branch slots the springs E' act to retain the clutch in a disconnected position and the shaft I remains at rest. Thus it will be seen that the device acts to stop the operation of connected mechanism as well as to vary the speed of its operation.

It has been stated above, in regard to Fig. 1, that the shaft A is the driving-shaft and the shaft I the driven shaft; but this order may be reversed, as shown in Fig. 5, that is intended to represent a portion of a grain-drill, showing one of the traction-wheels at K and its axle at *k*. To the spokes of this wheel is secured the cog-wheel K', meshing directly with the cog-wheel I² upon the shaft I. By this arrangement at least two shafts carrying gears and clutches, as shown upon the shaft A, can be made to mesh with the cog-wheels upon the shaft I, and be driven therefrom at equal or at different speed, as may be required.

Having thus described my invention and its operation, what I claim as new, and desire to secure by Letters Patent, is—

1. The combination of a shaft, provided with a loose gear and adjacent clutch, with a second shaft diagonal thereto, and provided with a fixed gear meshing with the loose gear of the first shaft, and with means for operating the clutch, substantially as shown and described.

2. The combination of a driving-shaft, provided with a series of uniform gears loosely mounted thereon, a series of separating collars, a series of shifting clutches, and means for operating the same, with a diagonally-arranged driven shaft having a series of gears varying in size and meshing with the loose gears of the driving-shaft.

3. The combination of a shaft having a series of clutches and loose gears with a diagonal shaft having a series of fixed gears, clutch-operating levers, and a dial-plate, substantially as shown and described.

4. In changeable gear mechanism, a series of clutch-levers, in combination with a dial-plate having a main and branch slots and a locking-pin adapted to be shifted in said slots, substantially as shown and described.

5. The combination of the shaft A, loose recessed gears B, the collar C, clutch D, lever E, dial-plate F, having slots G *g*, and locking-pin H, substantially as shown and described.

6. The combination of the shaft A, loose gears B B' B², clutches D, levers E, and dial-plate F with shaft I, fixed gears J J' J² and gears *i i*, and shaft I', substantially as shown and described.

In testimony whereof I affix my signature in presence of two witnesses.

THOMAS J. PERRETT.

Witnesses:
M. F. LENOX,
LABAN HAZELTINE.